United States Patent

[11] 3,565,100

| [72] | Inventor | Robert K. Pfleger |
| | | Miami, Fla. |
| [21] | Appl. No. | 786,239 |
| [22] | Filed | Dec. 23, 1968 |
| [45] | Patented | Feb. 23, 1971 |
| [73] | Assignee | Mec-O-Matic, Inc. |
| | | Miami, Fla. |
| | | a corporation of Florida |

[54] REVERSIBLE SELF-CLEANING CARTRIDGE VALVE
6 Claims, 7 Drawing Figs.

[52] U.S. Cl. .................................................. 137/269.5,
137/543.23; 251/333
[51] Int. Cl. ..................................................... F16k 15/02,
F16k 1/44
[50] Field of Search .......................................... 137/271,
269.5, 515.5, 515.3, 515.7, 543.23; 251/290, 333,
(O-Rings)

[56] References Cited
UNITED STATES PATENTS

| 631,036 | 8/1899 | Crump .......................... | 137/269.5 |
| 2,624,542 | 1/1953 | Ghormley ..................... | 251/332 |
| 2,960,998 | 11/1960 | Sinker et al. ................. | 137/543.23X |

FOREIGN PATENTS

| 717,860 | 9/1965 | Canada ......................... | 251/O-Ring |

Primary Examiner—M. Cary Nelson
Assistant Examiner—R. B. Rothman
Attorney—Charles M. Kaplan ABSTRACT: A reversible self-contained cartridge valve that is utilized as an inlet and outlet valve upon reversing the position of certain of the parts consisting of a hollow housing having a valve seat and a slidable valve body in the housing with a companion valve seat and O-ring positioned thereon and a spring urging the valve body into a closed position wherein the valve body operates as an inlet valve; the cartridge valve being further provided with a hollow plug having a valve seat identical to that of the housing valve seat whereupon the reversing of the valve body and spring in the housing the cartridge valve will operate as an outlet valve.

REVERSIBLE SELF-CLEANING CARTRIDGE VALVE

This invention relates generally to valve systems and is more particularly directed to a valve of a self-contained unit whose parts may be reversed for use as an inlet or outlet control valve.

In U.S. Pat. No. 3,286,933 issued to Savage on Nov. 22, 1966 for Duplex Chemical Feeding System, there is shown a pump system using a diaphragm type pump having a ball valve for an inlet and outlet valve with coil springs, O-rings and fittings, all of which are interchangeable. However, difficulty was experienced in the replacing of the valves since the valve assemblies are not preassembled prior to replacement in the pump, but instead, the individual parts constituting the valve assembly has to be placed individually in place and held against a coil spring as the fitting was threaded into position. If either of the coil spring, the ball valve or O-rings were not properly positioned or is moved out of proper position as the fitting was threaded into the valve body, the valve would not operate properly and such would not be discovered until the entire system was assembled. Consequently, it was found that the services of an expert workman was required to replace these valves and the time and effort required was exceedingly high thereby increasing the cost of repairs to the pump system.

The present invention avoids the above indicated problem by providing a cartridge-type valve consisting of a unit in which the various parts of the valve are contained. The valve proper may be reversed in the unit so that the valve be used to control the outlet or inlet flow of fluid. In replacing a valve, all that need be done is select a cartridge which has the valve in the proper position and thread the cartridge into the valve body.

Therefore, a principal object of the present invention is to provide a pump system with a self-contained valve assembled as a unit and mounted in position by merely threading the unit into the valve body.

Another object of the present invention is to provide a self-contained cartridge valve that will operate as an outlet or inlet valve by merely reversing the position of the valve itself.

A further object of the present invention is to provide a valve assembly which consists of interchangeable parts for use as an inlet or outlet valve, and wherein the parts thereof are contained within the unit and ready for mounting in a pump system by merely threading the unit in position.

A still further object of the present invention is to provide a valve for a pump system having an O-ring seal which is automatically cleaned in the opening and closing movements of the valve.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

FIGS. 6 and 7 are cross-sectional views of my valve showing the self-cleaning action during the seating thereof.

Figure 1:
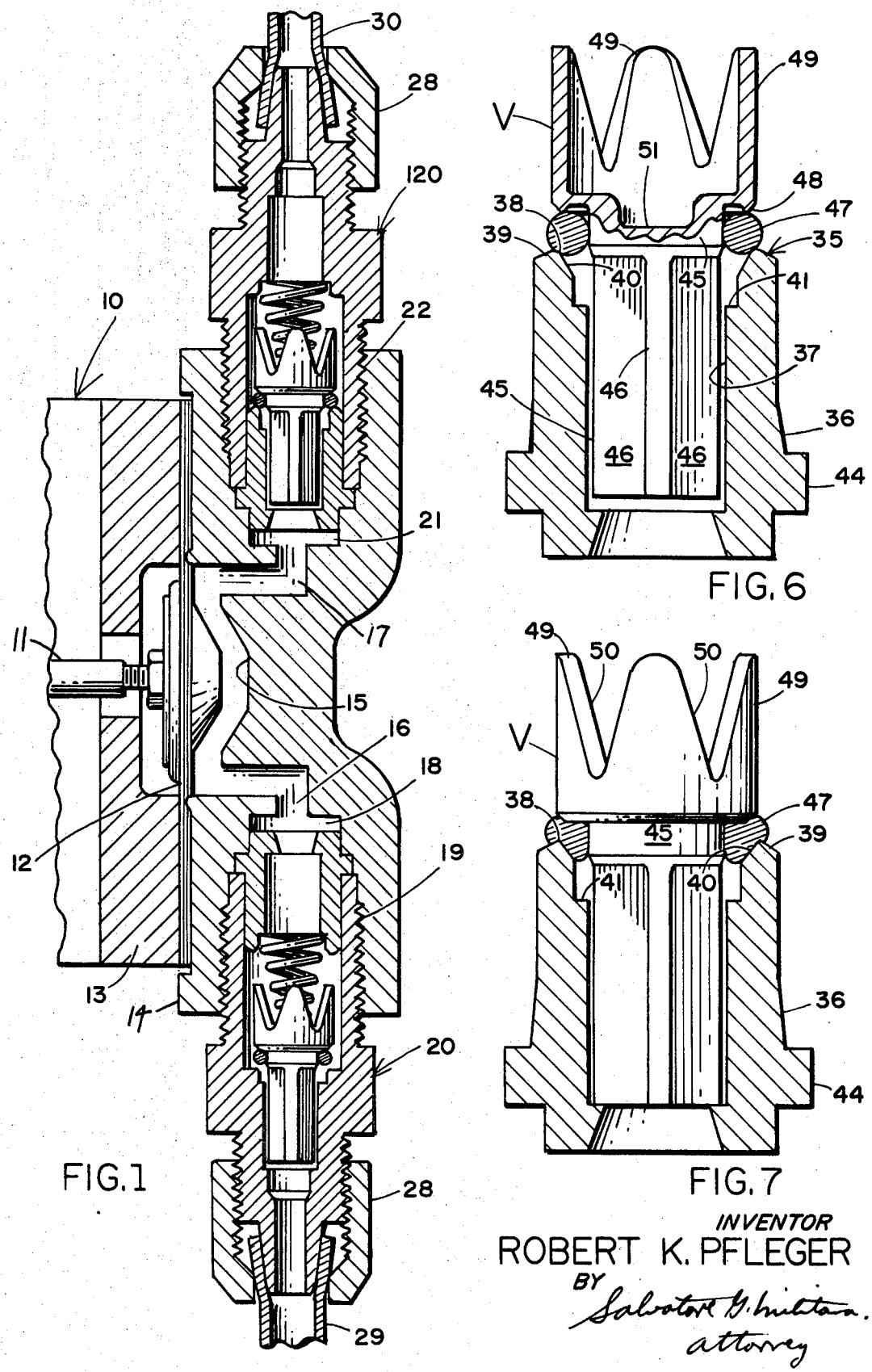
FIG. 1 is a fragmentary cross-sectional view of a diaphragm type pump utilizing my valve assembly cartridge.

Referring to the drawings wherein like numerals are used to refer to similar parts throughout the several views, the numeral 10 refers to that portion shown by FIG. 1 of a pump or chemical feed system shown and described in detail in the U.S. Pat. No. 3,286,933, and issued on Nov. 22, 1966, for Duplex Chemical Feeding System. In the patent a motor and eccentric construction (not shown) operates the pump shaft 11 which is made to oscillate axially. At the end of the pump shaft 11 is a flexible diaphragm 12 whose periphery is clamped between a casing 13 and a valve housing 14 to form an enclosed pump chamber 15 having an inlet passageway 16 and an outlet passageway 17 communicating therewith.

The inlet passageway 16 communicates with a chamber 18 formed in the lower portion of the valve housing 14 wherein the latter is threaded as at 19 for receiving my reversible self-contained cartridge valve 20 while at the upper portion of the valve housing 14 the outlet passageway 17 communicates with a chamber 21 wherein my reversible self-contained cartridge valve 120 is threadedly mounted as at 22. It is to be noted that the reversible self-contained cartridge valves 20 and 120 are identical in construction except that various parts thereof are reversed in position therein but are interchangeable as is explained in detail hereinafter.

Since both the inlet and outlet valve assemblies 20 and 120 respectively consist of the identical parts but in a different arrangement, a description of one will be the same for the other except as to pointing out the different arrangement of parts.

The cartridge housing 25 of both the inlet valve 20 and outlet valve 120 is threaded at one end as at 26 which is received by the threads 19 and 22 of the housing 14 while threads 27 at the other end of the cartridge housing 25 are received by couplings 28 that are connected respectively to an inlet pipe 29 and outlet pipe 30. Fluid flow through the cartridge housing 25 is effected through a passageway 31 which communicates with a slightly larger valve guide chamber 32 which in turn communicates with a still larger valve chamber 33 all of which together extend the full length of the cartridge housing 25. Within the chamber 32 is a first valve seat 34 which is identical in construction and configuration as a third valve seat 35 positioned on the inner end of a valve plug 36 which is provided with a fluid passageway 37 to permit the flow of fluid therethrough when the plug 36 is mounted in the chamber 33 of the cartridge 25.

Figure 2:
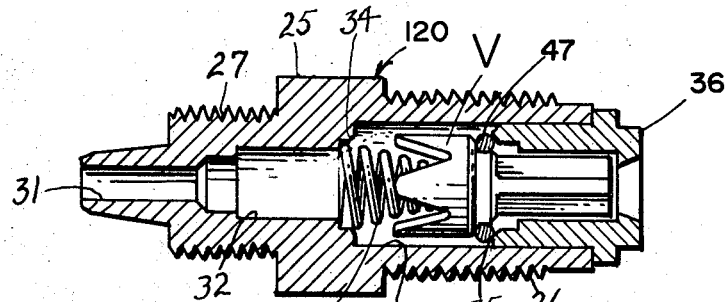
FIG. 2 is a cross-sectional view of my valve assembly cartridge showing the arrangement of the parts when used as an outlet valve with the valve shown in the seated position.
Figure 3:
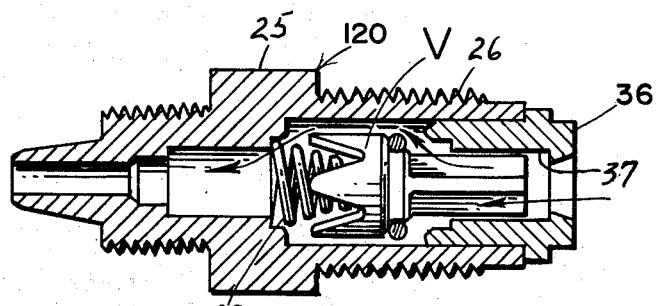
FIG. 3 is a similar view showing the valve assembly cartridge in an open position.
Figure 4:
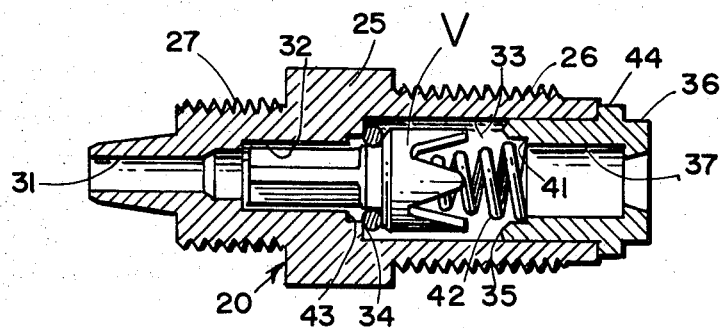
FIG. 4 is a cross-sectional view of my valve assembly cartridge showing the arrangement of parts when used as an inlet valve and with the valve in its seated position.
Figure 5:
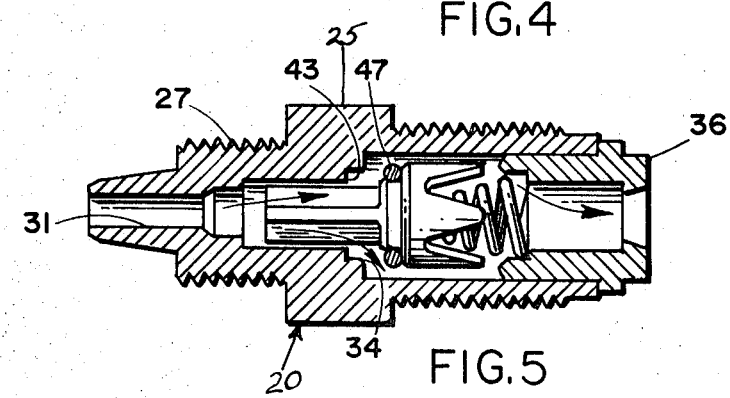
FIG. 5 is a similar view with the valve in its opened position.

Both of the valve seats 34 and 35 are provided with an inclined wall portions 39 and 40 extending to the mid portion of the valve seat to form a crest portion 38, the inner wall portion 49 being inclined at a greater angle than the outer wall portion 39. A peripheral shoulder 41 is formed adjacent to the valve seat 35 below the inner wall portion 40, which shoulder 41 serves as a support for a coil spring 42 when the cartridge 25 is assembled for use as an inlet valve as shown by FIGS. 4 and 5. Likewise a peripheral shoulder 43 is positioned in the valve guide chamber 32 adjacent to the valve seat 34; the shoulder 43 serving as a support for the coil spring 42 when the cartridge 25 is assembled for use as an outlet valve as shown by FIGS. 2 and 3. The valve plug 36 is provided with an external peripheral shoulder 44 which bears against the end of the housing 25 when the valve plug 36 is press fitted tightly in position thereon.

Controlling the flow of fluid through the valve housing 25 is a valve V consisting of a cylindrical body 45 of approximately the same diameter as that of the fluid passageway 37. Extending from one end of the valve body 45 are valve guide members 46 that extend radially along the axis of the valve body 45. The valve guide members 46 engage the side walls of the fluid passageway 37 when the valve V is used as an outlet valve (See FIGS. 2 and 3) or they engage the sidewalls of the valve guide chamber 32 when the valve V is utilized as an inlet valve. (See FIGS. 4 and 5). Since there is provided a resilient means, i.e. O-ring 47, as a sealant when the valve V is in its closed position, the valve V is provided with a V-shaped second valve seat 48 that engages the O-ring 47. It is to be noted that the diameter of the crest portion 38 of both the first and third valve seats 34 and 35 is slightly greater than the diameter of the crest portion of the second valve seat 48. In other words, a plane passing through the crest 38 of the valve seats 34 and 35 is offset from a plane passing through the crest of the valve seat 48. Since the position at which the valve seats 48, 34 (35) engage the O-ring during the seating operation is not coplanar, the forces exerted by the valve seats on the O-ring tend to rub or rotate the O-ring 47, and thereby effect a cleaning of the surface of the O-ring 47 as best shown by FIGS. 6 and 7.

Mounted on the valve body 45 is a crown formed by peripherally extending finger portions 49 having openings 50 to permit the continued flow of fluid in the even the finger portions 49 engaged the valve seats 34 or 35. A cavity 51 is formed in the top portion of the valve body 47 for supporting the coil spring 42.

As best shown by the comparison of FIGS. 2 and 4, FIG. 4 shows the arrangement of parts of the cartridge 20 being utilized as an inlet while FIG. 2 shows a different arrangement of the same parts utilizing the cartridge 120 as an outlet valve. In both instances, the cartridges 20 and 120 consist of the housing 25, valve plug 36, valve V, O-ring 47 and coil spring 42, the same parts being interchangeable in both cartridges.

However, when the cartridge 20 is to be used to control the flow of fluid into the pump chamber 15, the valve V is placed in the chamber 33 with its valve guide members 46 within the chamber 32, the O-ring 47 engaging the valve seat 34 with the coil spring 42 extending between the coil spring support shoulder 41 and the cavity 51 of the valve body 45 as shown by FIGS. 4 and 5.

When the cartridge 120 is utilized as an outlet, that is to control the flow of fluid leaving the pump chamber 15, as shown by FIGS. 2 and 3, the valve V is now placed in the chamber 33 with its guide members 46 positioned in the chamber 37 of the valve plug 36. The O-ring 47 now seats on the valve seat 35 when the valve V is closed and the coil spring 42 extends between the cavity 51 of the valve body 45 and the coil spring support or shoulder 43.

When the motor (not shown) is in its nonoperating position, as best shown by FIG. 1, the valves V of both the inlet cartridge 20 and outlet cartridge 120 will be in the closed position. The valve V of the inlet cartridge 20 will be seated on the valve seat 34 by virtue of the coil spring 42 as shown by FIG. 4. The valve V of the outlet cartridge 120 will be sealed on the valve seat 35 by virtue of the force exerted by the coil spring 42 as shown by FIG. 2.

Assuming there is fluid in the pump chamber 15, upon the motor (not shown) operating to oscillate the shaft 11 to its extended position, the flexible diaphragm 12 will be forced to move towards contact relation with the wall of the chamber 15 placing the fluid in the chamber 15 under pressure which force causes the valve V in the inlet carriage 20 to become seated while the valve V of the outlet cartridge 120 is lifted off the valve seat 35 against the coil spring pressure 42. Fluid will then flow out of the pump chamber 15, through passageway 17, chamber 21, passageway 37, past the valve seat 35 and unseated O-ring 47 and through the chambers 33, 32, and passageway 31 into the outlet pipe 30.

Now when the valve shaft 11 is oscillated in the direction away from the valve housing 14, the flexible diaphragm 12 will move away from the wall of the pump chamber 15 and create a suction or negative pressure, causing the valve V of the outlet cartridge 120 to seat against the valve seat 35 as shown by FIG. 2. The valve V of the inlet cartridge 20 will rise in the chamber 33 against the spring pressure 42, the O-ring 47 leaving the valve seat 34 as shown by FIG. 5 to permit the flow of fluid through the inlet tube 29, duct 31, past the valve guide members 46 in the chamber 32, between the valve seat 34 and O-ring 47, through the chamber 33, passageway 37 into the housing 14 where the fluid flowed through the chamber 18, duct 16 and into the pump chamber 15. This cycle of operation is then continued to provide a steady stream of fluid from a source (not shown), through my pump 10 and to destination (not shown).

From the above description taken in connection with the drawings, there is shown a pump having an inlet and outlet valve assembly consisting of the same parts but in a different arrangement and formed into a cartridge unit which is preassembled and merely threaded into position on the pump when valves are to be replaced therein. Also, as the valve V comes to its closed position whether in use to control the discharge or intake of the fluid, there is effected a cleaning action which removes any sediment, occlusions or deposits on the valve so that the valve V will always seat properly to stop the flow of fluid completely.

I claim:

1. A reversible self-contained cartridge valve comprising a substantially cylindrical housing having a plurality of communicating passageways disposed along the full length thereof, one of said passageways being larger in diameter than an adjoining passageway forming a peripheral shoulder member, first valve seat means positioned on said shoulder member, valve means slidably mounted in the larger of said passageways, said valve means having a valve body member, an O-ring positioned about said valve body member and engaging said first valve seat means, second valve seat means positioned on said valve body member and engaging said O-ring for sealing said passageways against flow of fluid therethrough, valve guide means mounted on said valve body and slidably positioned in the smaller of said passageways, plug means extending into said larger of said passageways, said plug means having a passageway substantially equal in diameter to that of said smaller passageway, spring means extending between said plug means and said valve body member yieldingly maintaining said first valve seat means and said second valve seat means in frictional engagement with said O-ring so as to seal against flow of fluid in one direction through said passageways and third valve seat means mounted on said plug means, said third valve seat means being substantially identical and in opposing relation to said first valve seat means whereby upon reversing the position of said valve means said valve guide means is slidably mounted in said passageway in said plug means and said spring means extends between said valve body member and said shoulder member yieldably maintains said second valve seat means and said third valve seat means in frictional engagement with said O-ring for sealing against flow of fluid in the opposite direction through said passageway, said first and third valve seat means having an outer and inner wall portion of substantially identical dimensions extending at an oblique angle toward each other and forming a first crest portion at their juncture.

2. The structure as recited by claim 1 wherein said second valve seat means having a second crest portion in opposing relation to said one of said first crest portions but slightly smaller in diameter than said first crest portions whereby upon the frictional engagement of said first and second crest portions with said O-ring, a rubbing action is effected and the surface of said O-ring is thereby cleaned of any foreign matter.

3. The structure as recited by claim 2 wherein said valve body member comprises a cylindrical portion with said O-ring engaging said cylindrical portion, and finger portions extending peripherally of said cylindrical portion in a direction opposite of said valve guide means, said finger portions being spaced from each other to permit the flow of fluid therethrough.

4. A valve comprising a housing having a passageway therein, a valve body member having an open position permitting fluid flow through said passageway and a closed position preventing fluid flow through said passageway, first seat means associated with said housing, second seat means associated with said valve body member, resilient sealing means positioned between said first and second seat means so as to frictionally contact said first and second seat means when said valve body member is in said closed position, said first seat means having a first crest portion thereon, said second seat means having a second crest portion thereon in opposing relation to said first crest portion and positioned such that a plane passing through said first crest portion is offset from a plane passing through said second crest portion whereby upon the frictional engagement of said first and second crest portions when said resilient means, a rubbing action against said resilient means is effected and the surface of said resilient means is thereby cleaned of any foreign matter.

5. A valve as defined in claim 4, wherein said resilient sealing means consists of an O-ring.

6. A valve comprising a substantially cylindrical housing having a plurality of communicating passageways disposed along the full length thereof, one of said passageways being larger in diameter than an adjoining passageway forming a peripheral shoulder member, first valve seat means positioned on said shoulder member, valve means slidably mounted in the larger of said passageways, an O-ring positioned about said valve member and engaging said first valve seat means, and second valve seat means positioned on said valve member and engaging said O-ring for sealing said passageways against flow of fluid therethrough, said first valve seat means having an outer and inner wall portion extending at an oblique angle toward each other and forming a first crest portion at their juncture, a said second valve seat means having a second crest portion in opposing relation to said first crest portion but slightly smaller in diameter than said first crest portion whereby upon the frictional engagement of said first and second crest portions with said O-ring, a rubbing action is effected and the surface of said O-ring is thereby cleaned of any foreign matter.